INVENTER
PETER S. HEPP
BY Donald R. Johnson
ATTORNEY

INVENTOR
PETER S. HEPP
BY Donald R. Johnson
ATTORNEY

United States Patent Office 3,408,286
Patented Oct. 29, 1968

3,408,286
CATALYTIC CRACKING WITH THE PURGING
OF THE REGENERATED CATALYST WITH A
LIQUID HYDROCARBON
Peter S. Hepp, Needham, Mass., assignor to Sun Oil Company, Philadelphia, Pa., a corporation of New Jersey
Filed July 6, 1967, Ser. No. 651,386
12 Claims. (Cl. 208—120)

ABSTRACT OF THE DISCLOSURE

A method of reducing catalyst regenerator gases which are normally charged with regenerated cracking catalyst which comprises charging a small amount of liquid hydrocarbon to regenerated catalyst under cracking conditions and removing the regenerator gases comprising nitrogen, carbon monoxide, and carbon dioxide displaced by the products of cracking before said regenerated catalyst is recharged to the cracker.

---

This invention relates to improvements in fluidized catalytic cracking to reduce the gases charged to the cracking reactor from the catalyst regenerator whereby in turn the burden on the recovery equipment is significantly reduced. More particularly the present invention relates to a method of displacing a substantial part of the residual regenerating gas accompanying regenerated catalyst, with desired gaseous hydrocarbons before recharging it to the cracking reactor.

Background of the invention

Catalytic cracking processes such as fluidized catalyst processes and equipment related thereto are well known and established processes. Almost every refiner has a cracking unit of the fluidizied type. The art is accordingly highly developed having received a lot of attention in the last twenty-five years more or less. In spite of this and the fact that it is a tested and proven commendable process, improvements continue to be desirable because of the close competitiveness in the field which has existed over a long period of time. These units are always of substantial size in terms of capacity and consequentially the large volumes of materials processed thereby. Accordingly any slight but clear-cut improvement has a magnified and substantial effect on the economics of such an operation. Any significant improvement in such a widely practiced commercial operation of such magnitude of volume is to be highly commended.

It is an important object of this invention to provide improvements in fluidized catalytic cracking processes of a significant degree whereby operating efficiencies and economies are obtained. It is another important object to reduce the size requirements of the equipment in certain process stages and the gas compressor and recovery equipment in particular. These goals are sought for new plants constructed henceforth whereby substantially reduced capital investment is realized, or increased capacity thereof can be realized in either present or existing units with similar effect. Other objects will become apparent from considering the present disclosure as a whole.

Summary of the invention

To the accomplishment of the foregoing and related ends a small, measured liquid feed stream is charged to the down side of the regenerated catalyst return conduit, or leg, for and containing regenerated catalyst being returned to the cracking reactor whereby said feed is cracked by the hot regenerated catalyst in said return leg whereby in turn nitrogen, carbon monoxide, carbon dioxide and the like gases produced in the regenerator are displaced from around but more importantly from the pores, foramina and/or foraminulous interstices of the interior of the catalyst itself.

Drawings

Figure 1:
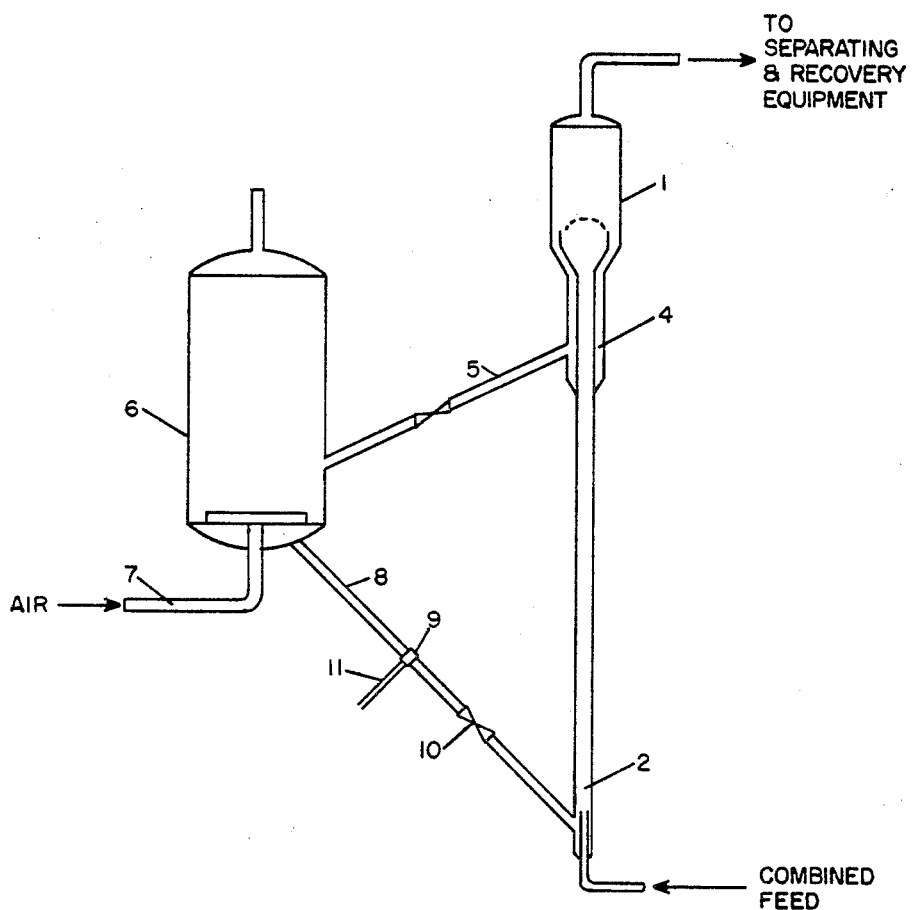
Figure 2:
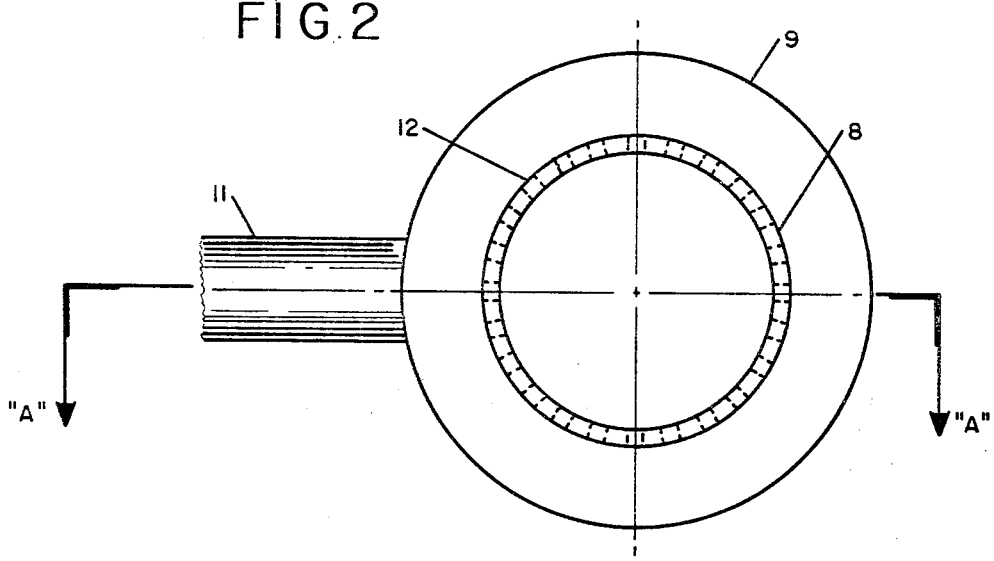
Figure 3:
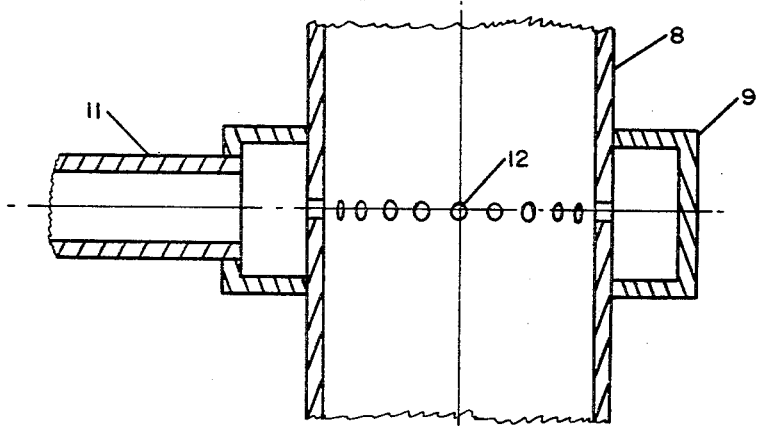
Figure 4:
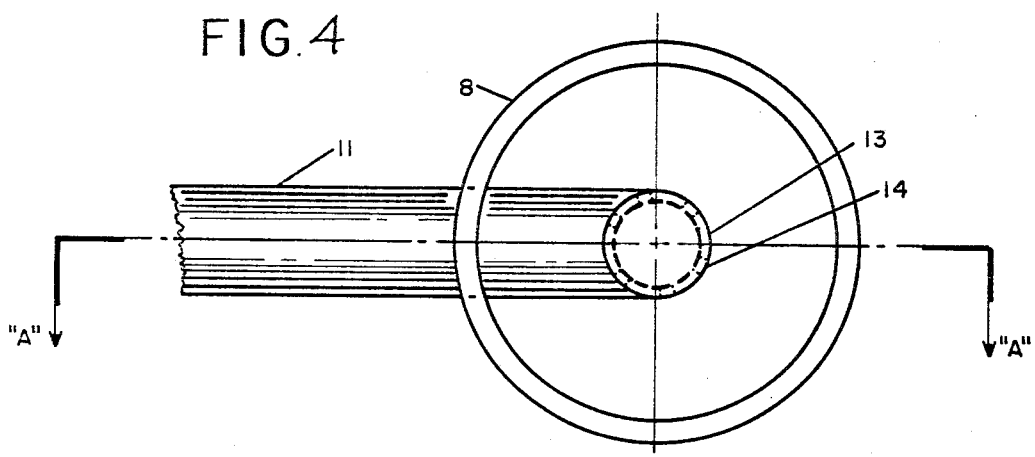
Figure 5:
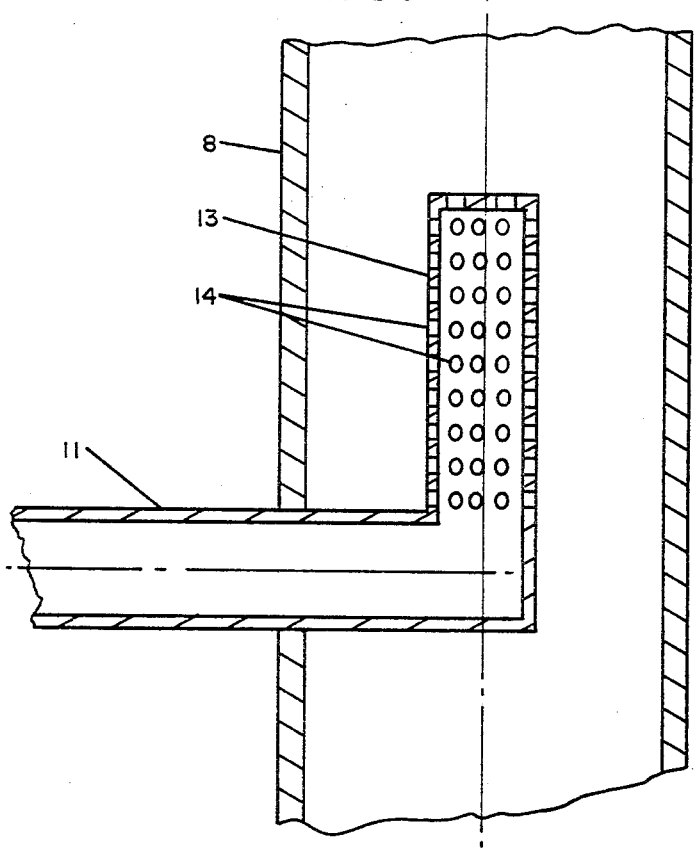

FIGURE 1 is a schematic flow diagram of a fluidized catalytic cracker and regenerator.
FIGURES 2 and 4 are enlarged plan views of a ring type and a tubular type feed distributor, respectively, providing alternative means for charging feed to a generator downcomer according to this invention.
FIGURES 3 and 5 are sectional views of FIGURES 2 and 4 respectively.

Detailed description

By the foregoing procedure the feed charged to the catalyst return leg is cracked and inert, undesired gases which fill the space or voids surrounding the catalyst material and the interior pores, foramina and/or foraminulous interstices of the catalyst material in the regenerator are displaced there by the rapid expansion of the products of the cracking. The displaced gases, usually nitrogen, carbon monoxide, and carbon dioxide, travel upward in the regenerator leg in counterflow to the movement of the regenerated catalyst toward the regenerator and they are vented at any convenient point above. Illustratively it is pointed out that the gases traveling up from the return conduit to the regenerator can be discharged with the bulk of the gases discharged from the regenerator. The displacing gases, from the return leg cracking, are products similar to those formed in the cracking reactor except for a definite propensity to be generally lighter products resulting from the higher degree of cracking which occurs in the leg attributable to the higher temperature there than in the cracking reactor proper. However, a substantial part of these return leg cracking products are desired products as contrasted to the usual residual regenerator effluent gases enveloping the catalyst in the return leg and within the catalyst pores which are not desired in subsequent stages. These undesired regenerator gases are in effect inerts in the cracker and subsequent stages. Notwithstanding this they are usually fortuitously displaced during cracking and subsequent stages and therefore must be processed to separate them. By the present invention the compressors and recovery equipment are relieved of processing a substantial amount of displaced inerts by displacing them with more desired material before they reach the reactor. The gas processing in the subsequent stages is thus relieved of handling a substantial amount of inerts.

While the precise manner of adding the hydrocarbon feed stream to the catalyst return leg is not extremely critical, some care is required in respect to the manner and amount in order to obtain substantial displacement of the gases within the interstices of the catalyst itself but without substantial excess of the hydrocarbon feed in the regenerator vessel of the process. Several methods of adding the stream are quite suitable, but, all methods of adding same are not suitable, and certainly even among the several methods that are suitable, there is significant variation in degree of efficacy or efficiency. With this understanding in mind several specific methods will now be described.

A small feed tube, conduit or distributor is positioned along the longitudinal axis of the return leg in a substantially central location. The feed tube is to have a plurality of outlets or jets for egress of the feed and the outlets are to be suitated or disposed so that the feed jet streams on egress are directed in a substantially radial direction with respect to the longitudinal axis of the return leg. The egression of the feed though radially directed with respect to the longitudinal axis of the return leg need not be perpendicularly disposed with respect thereto although in general a relationship being substantially perpendicular is usually to be preferred. Another preferred method for feed introduction is to feed distributor circumferentially disposed around the catalyst return leg so that the feed jet streams during egression from same focuses inwardly in radial fashion. Again the feed jets or streams so charged need not impinge on the imaginary line representing the longitudinal axis of the return leg at a perpendicular angle as other angles are suitable. An angle between about 45° and 135° will generally be preferred. However, more usually a feed jet stream angle of about 90° to 135° will be found more preferred. The foregoing angles being in general reference to the direction of catalyst flow.

The feed so charged to the return conduit is very quickly cracked because of the relatively small amount of feed charged as compared to the large amounts of regenerated catalyst and the very high temperature of same. The temperature of the catalyst in the return leg is usually on the order of about 1100° to 1300° F. The result is that the concomitant elevation of temperature of the feed stream and cracking thereof results in the sudden formation of gases and an explosive type expansion thereof. It is the force of this violent, explosive type of expansion of gases formed in the conduit that provides a gas drive with the requisite level of energy to drive the gaseous matter into the innermost pores, foramina and foraminulous interstices of the catalyst material thereby efficiently displacing the nitrogen, carbon oxide gases, and other inerts present after regeneration. The displaced gases travel upward in part due to the gas drive provided by the cracked feed stream and because the path of least resistance is, of course, up the slanted conduit. In the catalyst leg there is a manifold means (i.e., usually a slide valve) for controlling the amount of catalyst being charged to the reactor and this restriction tends to add to the other phenomena causing the excess gases to move in the direction of the regenerator.

The hydrocarbon feed stream can be closely measured and regulated to provide only so much gas upon cracking as to conveniently accomplish essentially the desired objects and yet experience the introduction of little or none of this hydrocarbon into the regenerator. While generally it will be desired to avoid the introduction of any of this hydrocarbon feed into the regenerator, the small amounts involved in fully accomplishing the desired objects will be such that even in the event of a substantial excess the actual amount of hydrocarbon would tend to be so small that any excess reaching the regenerator will not be sufficient to produce any detectable adverse effects. Any hydrocarbon feed that does reach the regenerator will simply be burned up there under the highly oxidative conditions. However, it may be more convenient from other considerations as well to interdict the gases flowing upward in the catalyst return leg to remove same before they reach the regenerator whether they contain substantial amounts of hydrocarbon or not.

As to the relative amounts of the hydrocarbon feed and the catalyst solids, that of course will vary commensurate with several factors. The factors and their interdependence however will be found hereinafter. Those skilled in the art will have little difficulty in calculating the amounts of feed to provide the desired displacement in any specific case from the teachings found herein.

One of the most important of the operative factors is the compactness or degree of porosity of the catalyst material. Temperature and pressure certainly have an effect, however as a practical matter, these generally operate within relatively narrow limits once operation has begun on a commercial basis. The temperature and pressure in the regenerator and the catalyst return conduit typically are in the ranges of about 1100° to 1300° F. and 20 to 40 p.s.i.a., respectively. More usually, the temperature is in the range of about 1150° to 1250° F. as a preferred operating range based on an all inclusive consideration encompassing the cracking reactor and the heat requirements thereof due to the endothermic nature of that reaction. Temperatures as high as about 1500° F. are possible, however, with some catalysts. As those skilled in the art know well, the very maximum temperature of operation that can be employed in any particular case regardless of the other considerations is, the sintering temperature of the particular catalyst. A temperature below that where sintering occurs must be used because sintering irreversibly deactivates the catalyst. The temperature and pressure effects vary inversely on the requisite amount of hydrocarbon feed to displace inerts from the catalyst passing through the return conduit. Temperature increases quite naturally tending to decrease the requisite amount of hydrocarbon charged and pressure increases tending to increase the requisite amount of hydrocarbon charged. With the foregoing as operative parameters affecting same to a lesser or greater degree the relative amounts of hydrocarbon feed to catalyst will generally be in the range of about 0.3–1.5 liquid volumes of feed per 1000 volumes of catalyst having an apparent bulk of density of about 15 to 20 lbs./ft.$^3$ and pore volume of about 0.3 to 0.6 cc./gram. Preferably the relative amounts are about 0.5 to 1.0 liquid volumes of hydrocarbon feed per 1000 volumes of catalyst on the same basis as in the foregoing instances.

The catalyst materials that may be employed are any effective cracking catalyst since its chemical composition is not critical to this inventive improvement. Examples of suitable type catalyst are the various natural clays, treated clays, amorphous silica, crystalline natural and synthetic zeolites and crystalline alumino-silicate zeolites. Illustrative clay types are those made from kaolin, acid-treated montmorillonite. Illustrative zeolites and descriptions follow.

The zeolite catalyst can be primarily crystalline or primarily amorphous in character, or a combination thereof. For example, the catalyst can be a primarily amorphous acidic alumino-silicate such as the zeolites of U.S. 2,253,285, 2,302,277, 2,617,712, 2,763,622, and 2,767,148. The catalyst can also be primarily crystalline aluminosilicate such as the protonated zeolites prepared by exchange of hydrogen ion for the sodium ion in heulandite, analcite, chabazite, and such synthetic zeolites as the type X zeolite of U.S. 2,882,244 and the zeolites of U.S. 3,200,083, which are denoted as Types Y and L. Other useful catalysts are those zeolite minerals such as levynite, brewsterite, edingtonite, staurolite, and zoisite, which contain less than 2 percent of alkali metal cations.

The acidic alumino-silicate catalyst will have a pH less than 7 in 10 percent aqueous suspension at 20° C. and preferably, will contain less than 3 percent of monovalent alkali metal cations, such as Na+.

Also useful as catalysts are crystalline alumino-silicate zeolites with amorphous binders wherein the monovalent alkali metal ions in the binder and in the crystalline zeolite are exchanged with H+ or polyvalent metal cations, such as the clay-bound zeolites of U.S. 3,158,579. Other useful catalysts are partially protonated, rare earth-exchanged crystalline zeolites in an amorphous silica-alumina matrix such as those of U.S. 3,140,251; 3,194,754; and 3,210,267.

Where the catalyst is to be regenerated at high temperature, especially preferred catalysts are those crystalline alumino-silicate zeolites having an Al/Si atomic ratio from 0.65 to 0.2 and containing at least one trivalent or divalent metal, metal oxide, or metal hydroxide cation for every 12 atoms of aluminum in said alumino-silicate and wherein there is no more than one monovalent metal cation of every 12 atoms of aluminum in said alumino-silicate. Such catalysts are usually prepared by ion-exchange of solvated protons and/or polyvalent metal cations for alkali metal and/or metal cations of such zeolites as analcite, chabazite, phillipsite, heulandite, Type Y of U.S. 3,013,984 and Type L of U.S. 3,013,984.

For example, suitable polyvalent metal cations are $Al^{+3}$, $Ni^{+3}$, $Ti^{+3}$, $V^{+3}$, $Mn^{+3}$, $Mo^{+3}$, $Ru^{+3}$, $Rh^{+3}$, $Sb^{+3}$, $La^{+3}$, $W^{+3}$, $Os^{+3}$, $Ir^{+3}$, $Bi^{+3}$, $Ce^{+3}$, $Pr^{+3}$, $Sm^{+3}$, $Gd^{+3}$, $Tb^{+3}$, $Dy^{+3}$, $U^{+3}$, $Mg^{+2}$, $Ca^{+2}$, $Ba^{+2}$, $Sr^{+2}$, $V^{+2}$, $Cr^{+2}$, $Mn^{+2}$, $Fe^{+2}$, $Co^{+2}$, $Ni^{+2}$, $Mo^{+2}$, $Ru^{+2}$, $Rh^{+2}$, $Pd^{+2}$, $Sn^{+2}$, $W^{+2}$, $Re^{+2}$, $Os^{+2}$, $Ir^{+2}$, $Pt^{+2}$, $Pb^{+2}$, $Sm^{+2}$, $Eu^{+2}$, $Gd^{+2}$, $Dy^{+2}$, $Yb^{+2}$, and the stable trivalent and divalent oxides and hydroxides of these metals, such as for manganese:

$Mn(OH)_4^{+3}$, $\quad$ $MnO(OH)_3^{+2}$,
$MnO(OH)_2^{+3}$, $\quad$ $Mn(OH)_4^{+2}$,
$MnO_2^{+3}$, $\quad$ $MnO(OH)_2^{+2}$,
$Mn(OH)_3^{+3}$, $\quad$ $MnO_2^{+2}$,
$MnO(OH)^{+3}$, $\quad$ $Mn(OH)_2^{+2}$,
$MnOH^{+3}$, $\quad$ $MnO^{+2}$,
$Mn(OH)_5^{+2}$, $\quad$ $MnOH^{+2}$;
$MnO_2(OH)^{+2}$, or for molybdenum:

$Mo(OH)_3^{+3}$, $\quad$ $MoO_2^{+2}$,
$MoO(OH)^{+3}$, $\quad$ $Mo(OH)_3^{+2}$,
$Mo(OH)_2^{+3}$, $\quad$ $MoO(OH)^{+2}$,
$MoO^{+3}$, $\quad$ $Mo(OH)_2^{+2}$,
$MoOH^{+3}$, $\quad$ $MoO^{+2}$,
$Mo(OH)_4^{+2}$, $\quad$ $MoOH^{+2}$;
$MoO(OH)_2^{+2}$, or for cerium:

$CeOH^{+3}$, $\quad$ $Ce(OH)_2^{+2}$,
$CeOH^{+2}$, $\quad$ $CeO^{+2}$.

For a given cation, the pH (or pK) of the exchange solution (and wash solutions) determines whether the exchanged species is the "bare cation" or a hydroxide. For activated zeolites the moisture content (as indicates by loss on ignition) determines whether exchanged hydroxide is present or was converted, by dehydration, to the oxide.

To facilitate the understanding of the invention, certain details and illustrative embodiments will now be set forth; however, of course, it is to be fully understood and appreciated that the invention is not limited to the specific conditions or details set forth in these examples, since the process is capable of many modifications and variations and conditions, such modifications and variations being aided, suggested or indicated by the discussion of the process as found herein and the discussions of the trends of the effect of the various factors.

*Illustrative example*

For convenience and ease of understanding, the present illustrative example will be discussed in relation to FIGURES 1, 2, and 3. An alternative feed distributor construction is described in FIGURES 4 and 5 following this illustrative example.

A fluidized catalytic cracker of the well known U.O.P. type is operated in normal or conventional fashion except for the modifications in equipment and process features incorporated in the regenerator downcomer required by the present invention is as follows:

Fresh cracker feed is charged to reactor 1 by means of riser 2 and is preheated in the riser. The cracking in reactor 1 is carried out at about 900–975° F. and 10–20 p.s.i.g. pressure in the presence of a fluidized catalyst. The cracking catalyst is a commercial high alumina catalyst (i.e., about 25% alumina and about 75% silica) having a particle size distribution at equilibrium as follows:

| Size (in microns): | Weight percent of total catalyst |
|---|---|
| 0–20 | 0 |
| 20–40 | 12 |
| 40–80 | 68 |
| 80+ | 20 |

The approximate bulk density of the catalyst is about 18 pounds/ft.³ at point 8 on FIGURE 1. Used catalyst from the reactor settles in usual fashion into the annular cavity 4 in the bottom of the reactor (or stripper) where it is charged in conventional fashion through a valve controlled conduit 5 to regenerator 6, air is charged to the regenerator through conduit 7 and carbonaceous deposits on the catalyst are removed by burning off same at about 1200° F. and about 20 p.s.i.g. The regenerated catalyst settles in the bottom of the regenerator and is fed into downcomer 8, there it travels down in the downcomer until it is met, according to this invention, at the point of the location of feed distributor 9 on the upside of valve 10 by a small amount of feed which might be called a drag stream. The distributor for the drag stream of feed is shown in detail in enlarged views FIGURES 2 an 3. The structures of FIGURES 2 an 3 like that of FIGURES 4 and 5 are described in detail at the end of this illustrative example. The charge fed through conduit 11 to the distributor 9 is an amount being about 1 barrel/hr. of feed per ton of catalyst min. circulated. Alternately stated, the drag stream of feed in the downcomer is about 2% by volume of the total feed being charged to the reactor or about 4% of the fresh feed. The feed in the downcomer is cracked and substantial amounts of the regenerator gases comprising a mixture approximately as follows:

| Component: | Percent (by volume on dry basis) |
|---|---|
| $N_2$ | 78 |
| CO | 12 |
| $CO_2$ | 10 | which forms an atmosphere around the catalyst particles on leaving the regenerator and which permeates a substantial part of the catalyst's interior pores and interstitial foraminulous voids, is displaced and travels up the topside of the downcomer to the regenerator 6 where it is vented with the other similar gases present from the regeneration step. The catalyst is then returned to the reactor 1 in controlled amounts as desired in conventional fashion. The gases leaving the reactor 1 are processed in conventional fashion to separate the nitrogen, carbon oxides, etc., (though present in lesser amounts than in the prior art they are still present) and the hydrocarbons recovered therefrom in conventional fashion.

FIGURE 2 is an enlarged plan view of the feed distributor 9 and FIGURE 3 is an enlarged cross-sectional view of such an exterior mounted feed distributor 9 and adjoining sections of downcomer 8 and feed conduit 11, said cross-section being longitudinally along downcomer 8 and conduit 11. The ports or egress jets of the distributor 9 are labeled 12 in the figures. The feed stream to the downcomer 8 to displace the inert gases from the catalyst in the downcomer enters the distributor 9 through conduit 11 and surrounds downcomer 8 and is jetted through ports 12 so as to be directed in a centrally focusing fashion whereby it is well distributed and directed at the catalyst from peripheral location.

FIGURE 4 is an enlarged plan view of a tubular type of feed distributor and FIGURE 5 is a cross-sectional view along the longitudinal axis of downcomer 8 showing a cross-sectional view of the tubular type of distributor indicated by 13 functionally equivalent to that in FIGURES 2 and 3. The tubular distributor 13 has apertures or ports 14 circumferentially disposed along same.

Having now described the invention, many ramifications and modified embodiments will readily occur to those skilled in the art. In so far as such variations do not depart from the spirit and scope of the invention described in this application, they are intended to be embraced by the appended claims in their broadest construction.

The invention claimed is:

1. In a catalytic cracking process wherein the catalyst is regenerated and recharged to the cracking zone, the improvement which comprises charging a small amount of liquid hydro-carbon to regenerated cracking catalyst under cracking conditions, in the regenerated catalyst conduit means, whereby regenerator gases are displaced from said regenerated catalyst by the products of cracking of said hydrocarbon and removing the so displaced regenerator product gases from said regenerated catalyst before recharging said regenerated catalyst to the cracker.

2. A process according to claim 1 wherein the amount of liquid hydrocarbon charged is sufficient at the cracking conditions employed to substantially displace the regenerator product gases from said regenerated catalyst.

3. A process according to claim 1 wherein said hydrocarbon charged is a drag stream of the cracking feed.

4. A process according to claim 1 wherein said cracking process employs a fluidized catalyst.

5. A process according to claim 3 wherein the regenerated cracking catalyst to which said drag stream is charged is at a temperature of about 1100° to 1500° F.

6. A process according to claim 5 wherein a pressure of about 20 to 40 p.s.i.a. is employed in said zone where the drag stream is charged to said regenerated catalyst.

7. A process according to claim 6 wherein the temperature is in the range of about 1150° to 1250° F.

8. A process according to claim 6 wherein the relative amount of hydrocarbon feed to catalyst is in the range of about 0.3 to 1.5 liquid volumes of feed per 1000 volumes of catalyst having a bulk density of about 15 to 20 lbs./ft.$^3$.

9. A process according to claim 7 wherein the catalyst has a pore volume of about 0.3 to 0.6 cc./gm.

10. A process according to claim 8 wherein the relative amounts of hydrocarbon feed to catalyst is in the range of about 0.5 to 1.0 liquid volumes of feed per 1000 volumes of catalyst.

11. A process according to claim 10 wherein the cracking process employs a fluidized catalyst.

12. A process according to claim 1 wherein said hydrocarbon is charged to said regenerated catalyst by means of a circumferentially disposed distributor on the catalyst return conduit, said distributor having a plurality of egress ports circumferentially disposed with respect to said catalyst in said catalyst return conduit.

References Cited
UNITED STATES PATENTS

| | | | |
|---|---|---|---|
| 2,658,859 | 11/1953 | Dart | 208—78 |
| 3,053,752 | 9/1962 | Swanson | 208—78 |

DELBERT E. GANTZ, *Primary Examiner.*

A. RIMENS, *Assistant Examiner.*